US008312425B2

(12) United States Patent
Hepper et al.

(10) Patent No.: US 8,312,425 B2
(45) Date of Patent: Nov. 13, 2012

(54) DYNAMIC TEMPLATE INSTANTIATION

(75) Inventors: Stefan Hepper, Holzgerlingen (DE);
Stefan Liesche, Boblingen (DE);
Andreas Nauerz, Boblingen (DE);
Juergen Schaeck, Boblingen (DE);
Thomas Stober, Bonlingen (DE)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 12/059,767

(22) Filed: Mar. 31, 2008

(65) Prior Publication Data

US 2009/0249374 A1    Oct. 1, 2009

(51) Int. Cl.
G06F 9/44    (2006.01)
(52) U.S. Cl. .................. 717/107; 717/104; 717/108
(58) Field of Classification Search .................. None
See application file for complete search history.

(56) References Cited

U.S. PATENT DOCUMENTS

| | | | | |
|---|---|---|---|---|
| 6,189,138 | B1 * | 2/2001 | Fowlow et al. | 717/107 |
| 7,178,129 | B2 * | 2/2007 | Katz | 717/108 |
| 2004/0098706 | A1 * | 5/2004 | Khan et al. | 717/120 |
| 2004/0187140 | A1 | 9/2004 | Aigner et al. | |
| 2005/0055667 | A1 * | 3/2005 | Beringer et al. | 717/108 |
| 2005/0125771 | A1 * | 6/2005 | Vitanov et al. | 717/104 |
| 2005/0268280 | A1 * | 12/2005 | Fildebrandt | 717/113 |
| 2006/0010421 | A1 * | 1/2006 | Gurevich et al. | 717/107 |
| 2006/0031849 | A1 * | 2/2006 | Barta et al. | 719/320 |
| 2006/0036687 | A1 | 2/2006 | Wood et al. | |
| 2006/0036993 | A1 | 2/2006 | Buehler et al. | |
| 2006/0165123 | A1 * | 7/2006 | Jerrard-Dunne et al. | 370/468 |
| 2007/0033571 | A1 * | 2/2007 | Moore et al. | 717/104 |
| 2007/0265814 | A1 | 11/2007 | Moore et al. | |
| 2008/0059949 | A1 * | 3/2008 | Matic | 717/108 |
| 2009/0172635 | A1 * | 7/2009 | Auriemma et al. | 717/107 |

OTHER PUBLICATIONS

Schmidt, R.Web Services Based Architectures to Support Dynamic Inter-organizational Business Processes, Lecture Notes in Computer Science, 2003, pp. 323-335, Retrieved on [Jun. 25, 2012] Retrieved from the Internet: URL<http://www.springerlink.com/content/7q02j55k1547h46r/fulltext.pdf>.*
Maturana, FP et al.Distributed multi-agent architecture for automation systems, Expert Systems with Applications, Jan. 2004, pp. 49-56, Retrieved on [Jun. 25, 2012] Retrieved from the Internet: URL<http://www.sciencedirect.com/science/article/pii/S095741740300068X>.*

* cited by examiner

*Primary Examiner* — Thuy Dao
*Assistant Examiner* — Cheneca Smith
(74) *Attorney, Agent, or Firm* — Yudell Isidore Ng Russell PLLC

(57) ABSTRACT

Method, system, and computer program product for instantiating a template in a composite application infrastructure. A template that describes a composite application having a plurality of application components is created. The template includes a composite application component assembly descriptor which lists each application component of the composite application. The template is stored in a template library. The composite application is instantiated using the template for creating at least one composite application instance. In an application instance registry, composite application instance(s) and instance information related to the composite application instance(s) is/are registered. The composite application instances are transiently represented in the application instance registry by a respective table entry without creating a real object. The real object that is dynamically created represents a particular composite application instance during a composite application usage session. At an end of the composite application usage session, the particular unused composite application instance is removed.

9 Claims, 4 Drawing Sheets

DYNAMIC TEMPLATE INSTANTIATION

BACKGROUND OF THE INVENTION

The present disclosure relates to computer runtime systems, and specifically composite applications implemented in computer runtime systems.

The process of building complex business logic using a set of components, such as portlets, can be a tedious endeavour. First, individual components are deployed sequentially. Then, the deployed individual components are arranged on a customer's staging system as desired. Finally, component interaction and access control are defined according to the business logic to be implemented. The above steps require active involvement of application developers, portal administrators and persons with the necessary business domain skills.

To simplify the aforementioned process, composite applications, such as composite portal applications (or portal server applications), were introduced as a key strategy for implementing meaningful business value within a Service Oriented Architecture (SOA). Composite portal applications provide a flexible framework to produce very complex websites with reasonable effort. The basic functional units of a composite portal application are application components (or portlets, when specifically referring to the functional units of a composite portal application). The composite portal application aggregates the output of the individual portlets to an output which can be rendered in a browser. This aggregation of content is an important feature of composite portal applications, since the composite portal application effectively integrates the user interface (UI) of independent portlets without the need to write any integration code.

Business analysts and application designers can leverage composite applications to assemble complex business logic easily from individual application components, such as JAVA® classes (JAVA® is a registered trademark of Sun Microsystems, Inc., portlets, Enterprise JAVA® Beans (EJBs) (EJB is a trademark or registered trademark of Sun Microsystems, Inc.), processes, Plain Old JAVA® Objects (POJOs), or other code artifacts. Portals expose a user to multiple services in a single interface. Composite applications allow the user to interact with these multiple services. Composite applications do away with multiple User Interfaces (UIs) and permit improved data connectivity. Composite applications achieve this by making functionality and data independent from an architecture. As a result, users can, on their own, define, create and manage composite portal applications. The use of a composite application delivery model emphasizes a move towards a strongly business-driven usage model with plug-ability and fewer dependencies on support by system administrators.

Modern composite portal applications typically have a considerable number of application components. Furthermore, application components can be added to an existing aggregation of application components to produce even more sophisticated composite applications. Each application component in the aggregation must be executable on the designated target system to which the composite portal application is deployed. One example of a target system is the JAVA® Platform, Enterprise Edition (J2EE), which provides a programming platform for developing and running distributed multi-tier architecture JAVA® applications. However, other target systems are conceivable as well. A complex composite portal application comprises manifold application component types, which are all suited together in a coherent composite application produced by a large application development team.

U.S. Published Patent Application US2006/0036993 A1 describes a system and method for developing a composite portal application by creating a portal application archive, and for automatically deploying the portal application archive into a portal server environment. A portal application is a specific type of application. In particular, a portal application is a collection of pages, portlets, policies, and roles. According to an embodiment of the method in accordance with the above mentioned document, a composite portal application is provided to a portal server environment as a portal application archive. The portal application archive includes (i) all application components in machine-readable code for forming the composite portal application, and (ii) an application component assembly descriptor in machine readable code that specifies how the application components need to be assembled such that the composite portal application is correctly deployed into the portal server environment.

In order to deploy the composite portal application into the portal server environment, the portal application archive is provided to a deployment mechanism within the portal server application environment. The deployment mechanism enables the deployment of the portal application archive into the portal server environment. Further, the application component assembly descriptor included in the portal application archive is evaluated by means of the deployment mechanism. The application components are automatically deployed into respective parts of the portal server application environment according to information included in the application component assembly descriptor.

The application component assembly descriptor can be implemented in the form of an Extensible Markup Language (XML) descriptor file and includes meta-data that describe how each particular application component of the composite portal application is to be used within the composite portal application. Each piece of meta-data is evaluated accordingly via the deployment mechanism described above. The meta-data provided by the application component assembly descriptor therefore provides added value for the composite application with respect to the standard JAVA® J2EE. While JAVA® supports coding, deployment, and life cycle aspects of composite portal applications, the meta-data can be regarded as comprising the logic focus description language on top of JAVA® and can be implemented in the form of XML.

The application component assembly descriptor can be viewed as a template, which describes how to create/instantiate one or multiple instances of the composite application. The instantiation results in a set of portlet instances and page instances. According to the current state in the art, a composite application's runtime environment creates all the resources that are needed to represent the desired composite application. Such resources can be component instances, Portal pages, code instances, portlet instances, and other types of layout elements. The current approach provides a very efficient way to generate many similar Portal applications, while using a common template definition.

However, the drawback of the described template instantiation is that the instantiation process creates real resources in the portal. These real resources consume memory and limit the number of possible instances that can be used. According to some use-cases, the consequences of such a drawback do not have a significant impact (e.g., when there are only a limited number of teamroom applications on a system). However, there are use-cases, where the fact that individual copies of the same portal resources are needed for each instance is a severe limitation. One exemplary scenario where such severe limitations occur is in the use of a web conference application or an "activities" application, which will need to scale to a considerably higher number of supported instances. As a result, there can potentially be thousands of scheduled web conferences, while only a few web conferences will be able to take place concurrently. Thus, in summary, a limitation of the existing approach is that the template is used to permanently generate new instances of the composite application. For scalability reasons, such an approach is not suitable if a large number of instances of the same template are required.

SUMMARY OF THE ILLUSTRATIVE EMBODIMENTS

In view of the foregoing, a method, system, and computer program product for instantiating a template in a composite application infrastructure are disclosed. A template that describes a composite application having a plurality of application components is created. The template includes a composite application component assembly descriptor which lists each of the plurality of application components of the composite application. The template is stored in a template library. The composite application is instantiated using the template for creating at least one composite application instance. In an application instance registry, one or more composite application instances and instance information related to the one or more composite application instances are registered. The one or more composite application instances are transiently represented in the application instance registry by a respective table entry without creating a real object. The real object is dynamically created. The real object represents a particular composite application instance during a composite application usage session. The dynamic creation is based on a most recent version of the template having the composite application component assembly descriptor. After an end of the composite application usage session, the particular composite application instance representing the real object is then removed.

All objects, features, and advantages of the present invention will become apparent in the following detailed written description.

BRIEF DESCRIPTION OF THE DRAWINGS

Aspects of the invention itself will best be understood by reference to the following detailed description of an illustrative embodiment when read in conjunction with the accompanying drawings, where.

DETAILED DESCRIPTION OF THE DRAWINGS

Figure 1:
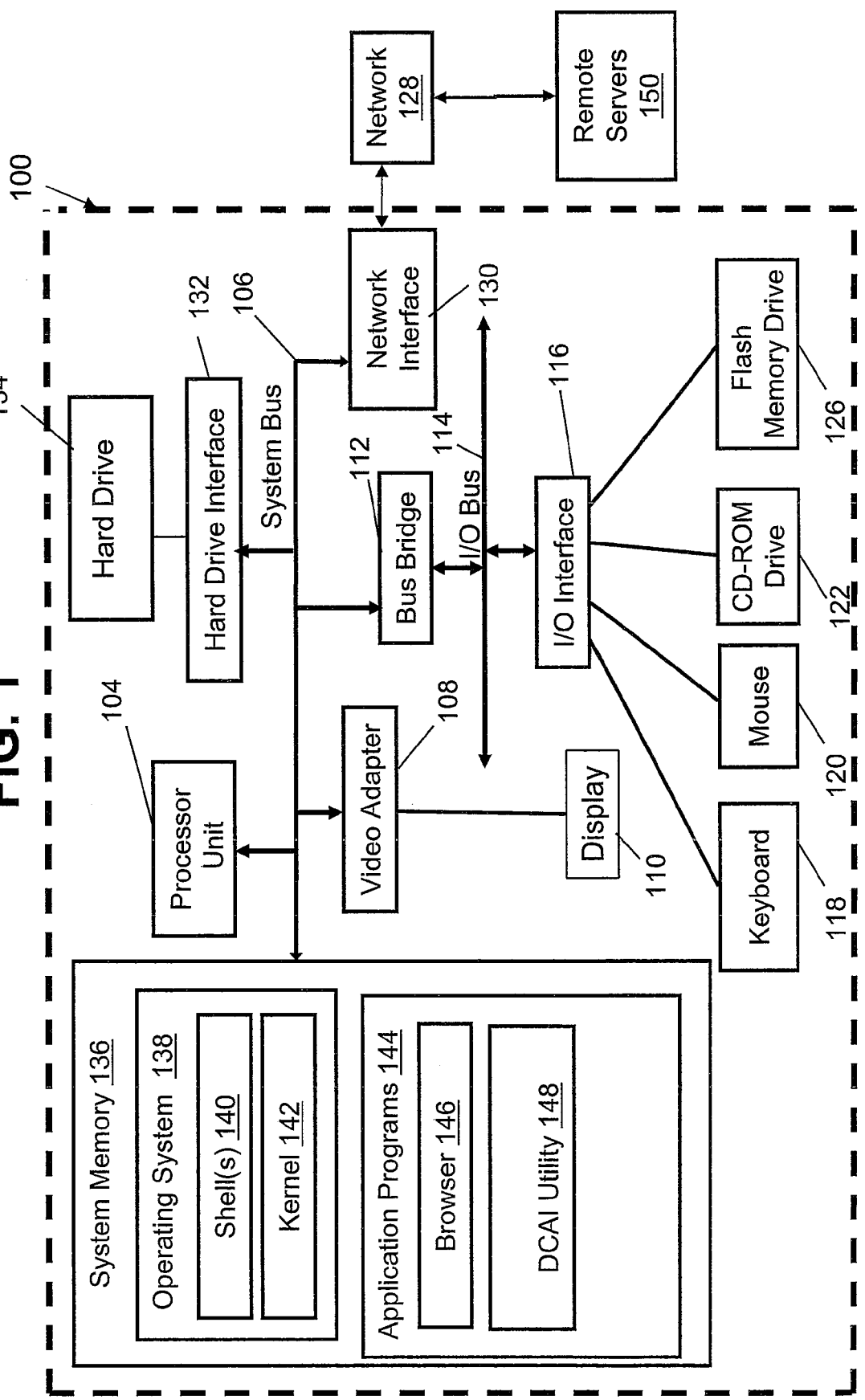
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, a software embodiment (including firmware, resident software, microcode, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable storage medium may be utilized. The computer-readable storage medium may be, for example but not limited to, an electronic, magnetic, optical, electromagnetic, infrared, or semiconductor system, apparatus or device. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable storage medium may be any medium that can store the program for use by or in connection with the instruction execution system, apparatus, or device.

Computer program code for carrying out operations of the present invention may be written in an object oriented programming language such as JAVA®, Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, and in particular to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a remote server 150 via a network 128 using a network interface 130, which is coupled to system bus 106. Network 128 may be an external network such as the Internet, or an internal network such as an Ethernet or a Virtual Private Network (VPN). Remote server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX® (UNIX is a registered trademark of The Open Group in the United States and other countries)) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with remote server 150. Application programs 144 in system memory 136 also include a Dynamic Composite Application Instantiation (DCAI) Utility 148. DCAI utility 148 performs the functions illustrated below in FIG. 4, and may include all logic, helper functions, databases and other resources depicted below in FIGS. 2-3. DCAI utility 148 processes electronic signals from a multitude of sources, such as remote server 150 in network 128, as well as from other application programs 144.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
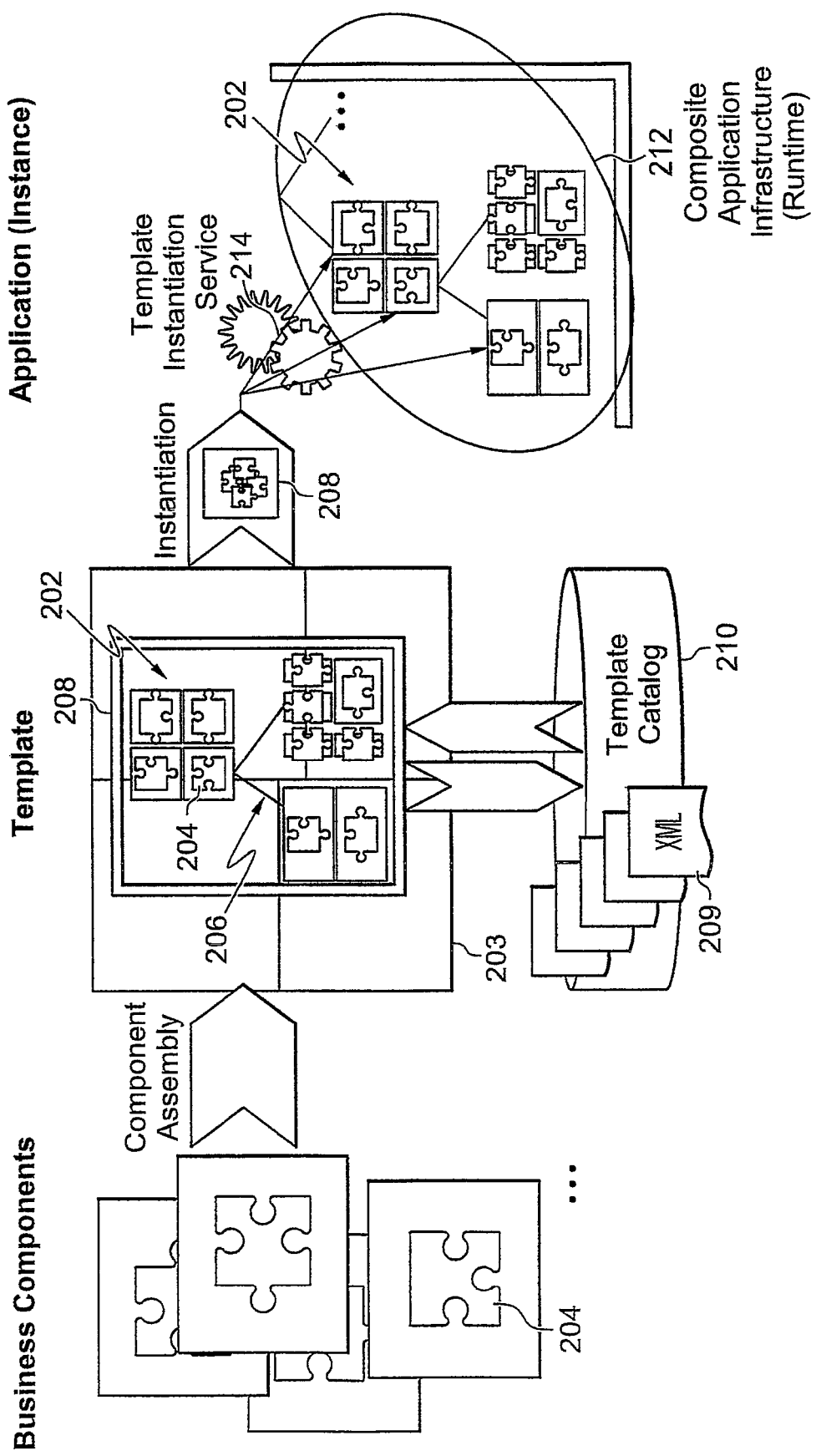
FIG. 2 is an exemplary illustration that represents how one or more instances of a composite application are created, according to an embodiment of the present invention.

Referring now to FIG. 2, exemplary illustration 200 shows how one or more instances 202 of composite applications 203 are created, according to one embodiment that is useful for understanding the invention. Composite applications aggregate a set of application components 204 (e.g., business components) into a single, coherent entity. Individual application components 204 and the interactions (indicated by arrow 206) among these application component(s) 204 work together to implement complex logic (e.g., business logic) as defined by an end-user (e.g., business user). Examples of application components 204 of composite application 203 include, but are not limited to, JAVA® classes, portlets, Enterprise JAVA® Beans (EJBs), processes, Plain Old JAVA® Objects (POJOs), or other code artifacts.

Composite applications involve template 208. Template 208 describes a composite application in an abstract way (i.e., a "blueprint" for composite application 203). Template 208 includes information that defines how complex logic is assembled out of a given set of application components 204. In most cases, template 208 is an XML file 209 that references all applicable application components 204. Additionally, template 208 specifies meta-data (e.g., such as specific configuration settings) for each application component 204. Template 208 describes the behavior of composite application 203 and to define the desired interaction between application components 204 (e.g., wires between portlets). Moreover, template 208 defines which desired access control logic is to be enforced, such as application-specific user roles. Template 208 is also used to exchange composite application definitions between different runtime target platform systems. After creating template 208, template 208 is stored in template catalog 210 and made available to a user community. For example, template catalog 210 may be represented by a JAVA® Content Repository (JCR) content store.

Using defined template 208, a user can create one or more instances 202 (or application instances) of composite application 203. The user selects template 208 (e.g., template XML file 209) from template catalog 210 and creates one or more instances 202 of composite application 203 based on a definition of template 208. The instances 202 run within application runtime target platform system, which is referred to as Composite Application Infrastructure (CAI) 212. Thus, each end-user manages his/her particular instance 202 of composite application 203, without having the need for administrative authority. A set of tools are used to enable end-users to assemble and manage business logic from individual application components 204 that can include, for example, portlets, processes, or other code artifacts.

Moreover, FIG. 2 shows how business components 204, template 208, and composite application instances 202 relate to each other. Template 208 is assembled from business components 204 and stored as an XML description file 209 in template catalog 210. Template instantiation service 214 creates (or instantiates) one or more application instances 202 in CAI 212. It should be appreciated by persons of ordinary skill in the art that the particular standard that is used to describe template 208 can vary from the example using XML. Other standards that can be used to describe the various business components 204 include, but are not limited to Common Object Request Broker Architecture (CORBA) and JAVA®. The functionality of each application component 204 is described.

Figure 3:
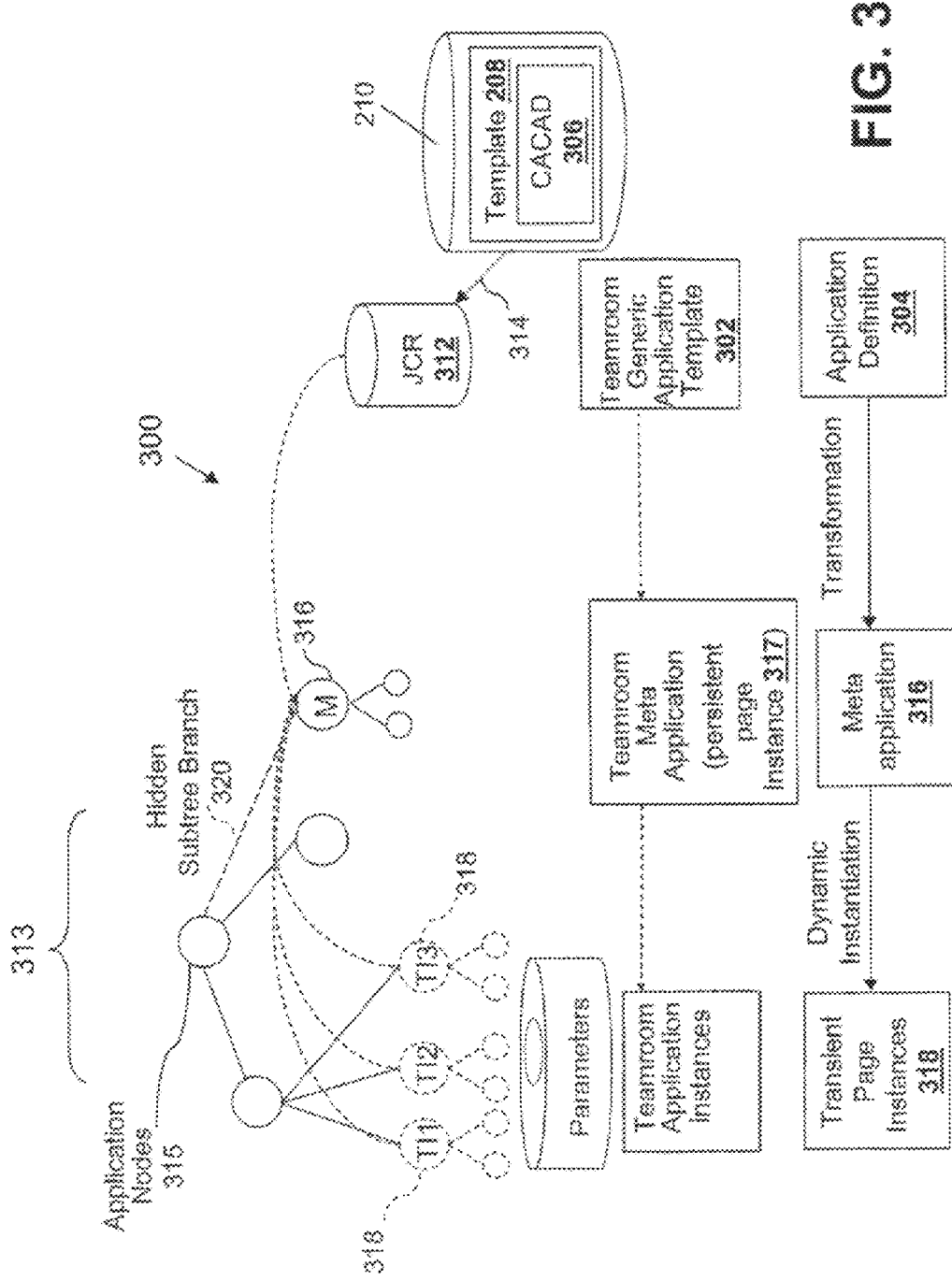
FIG. 3 is an exemplary diagram of a system for dynamic instantiation of a composite application, according to one embodiment of the invention.

FIG. 3 shows an exemplary diagram of system 300 for dynamic instantiation of a composite application, according to one embodiment of the invention. System 300 includes template 208 (e.g., Teamroom Generic Application Template 302), which defines one or more instances 202 (or composite application instances) of composite application 203 via application definition 304. Template 208 is stored in template catalog (or template library) 210. For example, template library 210 can be represented by a JCR content store. Template 208 includes a composite application component assembly descriptor (CACAD) 306 in machine-readable code that lists each application component 204 of composite application 203.

System 300 also includes an application instance registry (e.g., JCR 312) that registers (i) one or more composite application instances and (ii) instance information related to each composite application instance, once template 208 has been instantiated (indicated by arrow 314). Instance information can include, for example, specific values for parameters and owner information. Thus, rather than creating physical objects (or real objects) for each composite application instance, each composite application instance is transiently represented by a respective table entry.

According to one embodiment, before a user can gain access to a particular composite application instance, meta application 316 (e.g., Teamroom Meta Application) is created. Meta application 316 includes a sample persistent page instance 317 of composite application 203, which is dynamically created via a transformation from application definition 304. The persistent (or real) sample instance of meta application 316 can be dynamically cloned as one or more Transient Instances (TI or transient page instances) 318 (e.g., Teamroom Application Instances: TI1, TI2, and TI3 forming application nodes 315 of composite application tree 313) whenever a copy of composite application 203 is needed during a composite application usage session. Moreover, the dynamic creation of meta application 316 (i.e., a real object) in response to a composite application usage session is based on the most recent version of template 208. As a result, a user will be provided the most up-to-date version of template 208 upon initiating the composite application usage session. In the example shown in FIG. 3, meta application 316 forms part of a node within hidden sub-tree branch (represented by dashed connector 320) of composite application tree 313.

Figure 4:
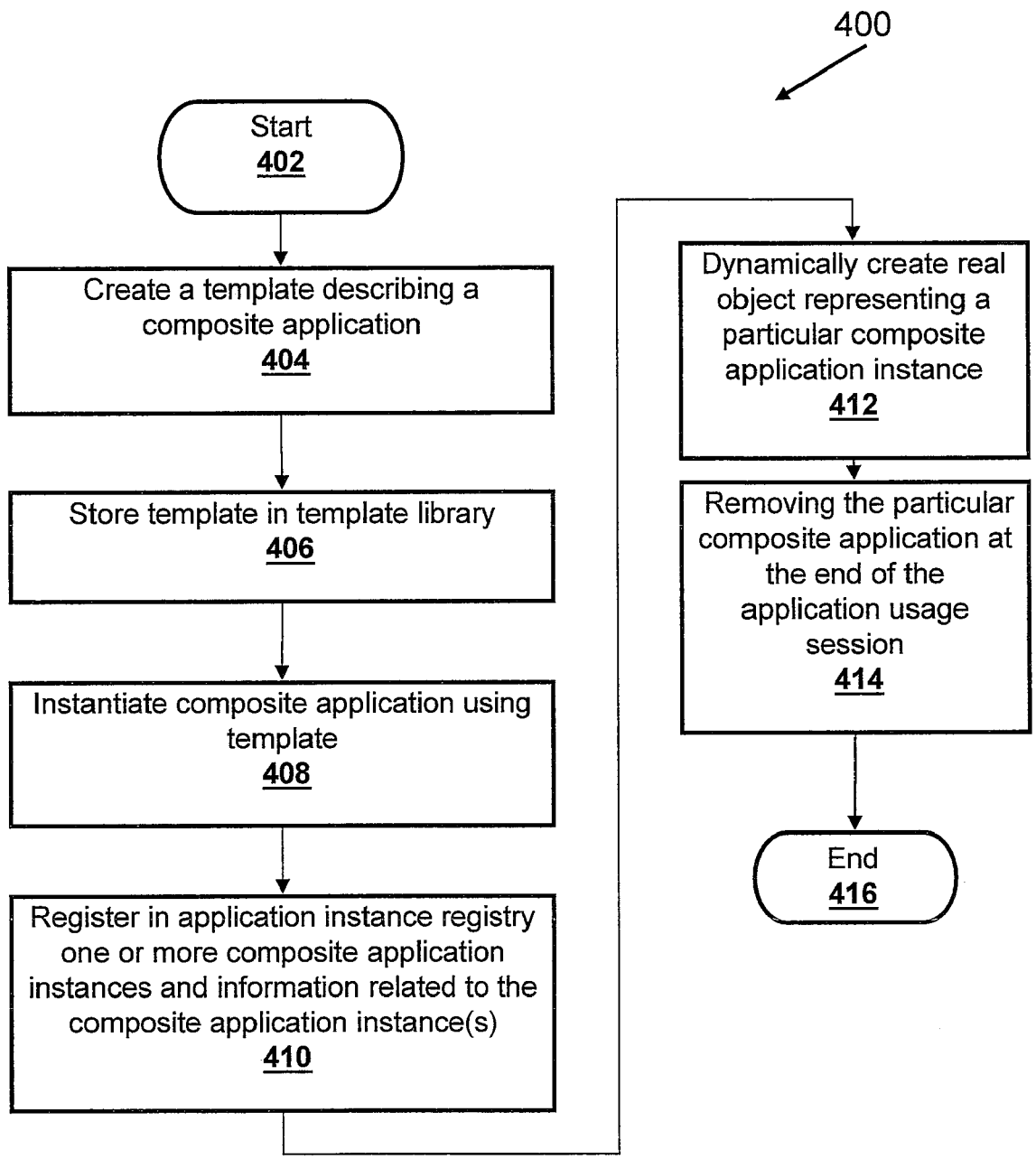
FIG. 4 is high-level flow-chart of an exemplary method for dynamically instantiating a template in a composite application infrastructure (CAI), according to an embodiment of the present invention.

FIG. 4 is a flow-chart 400 of an exemplary method containing steps for instantiating template 208 in a composite application infrastructure (CAI) 212. According to the present invention, the exemplary method in FIG. 4 is implemented in DCAI utility 148 of FIG. 1 and exemplary illustrations 200 and 300 of FIGS. 2 and 3, respectively. After initiator block 402, template 208 is created, as depicted in block 404. Template 208 describes composite application 203 having one or more application components 204. In one embodiment, template 208 is included within composite application package 312, which includes (i) CACAD 306 for listing each application component 204 of composite application 203 and describing the functionality of each application component 204, and (ii) one or more platform-specific handlers (not shown) for deploying composite application components for a plurality of different target platforms (not shown).

From block 404, the method continues to block 406, where template 208 is stored in template library 210. At block 408, one or more instances of composite application 203 is/are then instantiated using template 208. As part of the instantiation method, one or more composite application instances and instance information related to the application instance(s) are registered in application instance registry 312, as depicted in block 410. With regard to block 410, one or more composite application instances are transiently represented in application instance registry 312 by a respective table entry, such that a real object is not created. According to one embodiment, each dynamic instance is created from an XML deployment descriptor. From block 410, the method proceeds to block 412, where a real object (e.g., persistent page instance 317) is dynamically created during a composite application usage session. According to one embodiment, the real object is defined as meta application 316. The dynamic creation of the real object is based on a most recent version of template 208 having CACAD 306.

Once the composite application usage session has ended (i.e., the particular composite application instance is no longer used or will not be used for a predetermined time), the particular composite application instance representing the real object is removed, as depicted in block 414. As a result, system resources are released for other use. According to one embodiment, the composite application instances are removed once the last user of the composite application has logged out of the system. Moreover, according to another embodiment, a daemon (not shown) is implemented to remove unused composite application instances during certain execution intervals. From block 414, the method ends at termination block 416.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method executed by a processor of instantiating a template in a composite application infrastructure, said method comprising:
   in a template library accessible to a computer system, storing a template describing a composite application having a plurality of application components, wherein said template defines interactions between the plurality of application components and includes a composite application component assembly descriptor listing each of said plurality of application components of said composite application;
   instantiating said composite application using said template by:
      registering, in an application instance registry of the computer system, a plurality of composite application instances of the composite application and respective instance information specifying respective parameters for each of the plurality of composite application instances, wherein each of said plurality of composite application instances is transiently represented in said application instance registry by a respective table entry without creating in data storage of the computer system a real object representing the corresponding composite application instance;
      in response to initiation of a composite application usage session, dynamically creating in the data storage of the computer system a meta application as a persistent real object in the data storage of the computer system by transformation of a most recent version of the template;
      during the composite application usage session, creating, as needed, each of multiple composite application instances among the plurality of composite application instances as transient real objects in the data storage by cloning the persistent meta application; and
   removing the transient real objects corresponding to the multiple composite application instances from the data storage of the computer system after an end of said composite application usage session.

2. The method of claim 1, wherein the meta application forms a node within a hidden sub-tree branch of a composite application tree of the composite application.

3. The method of claim 1, wherein the application instance registry comprises a JAVA content repository.

4. A program product, comprising:
   a non-transitory computer-readable storage medium; and
   program code stored within the non-transitory computer-readable storage medium, wherein the program code, when executed by a computer, causes the computer to perform:
      in a template library accessible to a computer system, storing a template describing a composite application having a plurality of application components, wherein said template defines interactions between the plurality of application components and includes a composite application component assembly descriptor listing each of said plurality of application components of said composite application;
      instantiating said composite application using said template by:
         registering, in an application instance registry of the computer system, a plurality of composite application instances of the composite application and respective instance information specifying respective parameters for each of the plurality of composite application instances, wherein each of said plurality of composite application instances is transiently represented in said application instance registry by a respective table entry without creating in data storage of the computer system a real object representing the corresponding composite application instance;
         in response to initiation of a composite application usage session, dynamically creating in the data storage of the computer system a meta application as a persistent real object in the data storage of the computer system by transformation of a most recent version of the template;
         during the composite application usage session, creating, as needed, each of multiple composite application instances among the plurality of composite application instances as transient real objects in the data storage by cloning the persistent meta application; and
      removing the transient real objects corresponding to the multiple composite application instances from the data storage of the computer system after an end of said composite application usage session.

5. The program product of claim 4, wherein the meta application forms a node within a hidden sub-tree branch of a composite application tree of the composite application.

6. The program product of claim 4, wherein the application instance registry comprises a JAVA content repository.

7. A data processing system, comprising:
   a hardware processor unit;
   data storage coupled to the hardware processor unit, wherein the data storage includes a template library and an application instance registry, wherein the template library includes a template describing a composite application having a plurality of application components, wherein said template defines interactions between the plurality of application components and includes a composite application component assembly descriptor listing each of said plurality of application components of said composite application; and
   program code stored within the data storage, wherein the program code, when executed by the hardware processor unit, causes the hardware processor unit to manage instantiation of said composite application using the template by:
      registering, in an application instance registry of the computer system, a plurality of composite application instances of the composite application and respective instance information specifying respective parameters for each of the plurality of composite application instances, wherein each of said plurality of composite application instances is transiently represented in said application instance registry by a respective table entry without creating in data storage of the computer system a real object representing the corresponding composite application instance;

in response to initiation of a composite application usage session, dynamically creating in the data storage of the computer system a meta application as a persistent real object in the data storage of the computer system by transformation of a most recent version of the template;

during the composite application usage session, creating, as needed, each of multiple composite application instances among the plurality of composite application instances as transient real objects in the data storage by cloning the persistent meta application; and removing the transient real objects corresponding to the multiple composite application instances from the data storage of the computer system after an end of said composite application usage session.

8. The data processing system of claim 7, wherein the meta application forms a node within a hidden sub-tree branch of a composite application tree of the composite application.

9. The data processing system of claim 7, wherein the application instance registry comprises a JAVA content repository.

* * * * *